Nov. 26, 1968  C. C. HARDMAN  3,413,205

ELECTROLYTIC ETCHING OF CAPACITOR METAL

Filed Feb. 28, 1966

WITNESSES
Theodore F. Wrobel
Leon M. Garman

INVENTOR
Carl C. Hardman
BY Alex Mich, Jr.
ATTORNEY

United States Patent Office 3,413,205
Patented Nov. 26, 1968

3,413,205
ELECTROLYTIC ETCHING OF
CAPACITOR METAL
Carl C. Hardman, Pittsburgh, Pa., assignor to Westinghouse Electric Corporation, Pittsburgh, Pa., a corporation of Pennsylvania
Filed Feb. 28, 1966, Ser. No. 530,438
10 Claims. (Cl. 204—141)

This invention relates to a method and solution for etching metals, and more particularly to a method and solution for etching metals to increase their surface areas so as to render the metals more suitable for use as capacitor electrodes.

It is, of course, well known that the capacitance of a charged dielectric film is directly proportional to the area of the film. Advantages such as lower cost and smaller spatial requirements attend capacitors which employ metal foil electrodes having large effective surface areas. The large surface areas are particularly important when the electrodes are fabricated from expensive metals such as titanium, tantalum and the like. A considerable amount of work has been directed to methods and solutions for etching metal electrodes in order to increase the effective surface area of the electrodes. The methods are generally electromechanical in nature and are designed to attack the foil surface.

Etching will increase the effective area of the electrode and provide a corresponding increase in the electrical capacity per unit of projected electrode area or the capacity value for a given overall or gross electrode size. Hence, one measure of the improvement afforded by a particular etching method or solution is the capacitance gain. Capacitance gain is defined as the ratio of the capacitance of the etched foil to the capacitance of the unetched foil, employing the same electrolyte, anodization and other procedures in making the capacitors and measuring the capacitance. To determine this capacitance gain, a foil segment of a particular metal is etched, anodized and then subjected to capacitance measuring techniques. The capacitance of the etched foil segment is then compared with the capacitance of an unetched foil segment of the same metal and the same dimensions.

Capacitance gains of up to about 4.4 have been reported for tantalum foils etched with various electrolyte solutions of ammonium bromide, calcium chloride and methanol, wherein the water content of the solution was varied to determine the optimum solution composition. Among the other elemental, film-forming metals suitable for use in capacitors are titanium, niobium and zirconium. Capacitance gains for these latter metals and alloys thereof ranging from about 1.6 to about 2.5 also have been reported.

As a general object, the present invention seeks to provide a method and a solution for etching capacitor electrodes and increasing the effective area of the electrodes.

Another object of the invention is to provide a method for electrolytically etching capacitor electrodes to achieve very large capacitance gains.

A further object of the invention is to provide an etching solution or etching electrolyte for etching metals suitable for use as capacitor electrodes.

The above and other objects and advantages of the present invention will become apparent from the following detailed description with reference to the accompanying drawings, in which.

Figure 1:
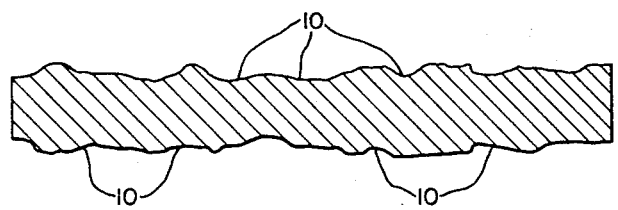
FIGURE 1 is a photomicrograph of a cross-section of a titanium foil or electrode etched by the known process described above.

While the following description deals mainly with titanium, it is to be understood that the disclosed etching electrolytes produce similar results with respect to the other capacitor electrode metals mentioned, i.e., tantalum, zirconium, niobium and alloys thereof. The titanium is used primarily in describing the results obtained.

In accordance with the invention, the titanium capacitor electrode material to be etched is made the anode while plates of tantalum, titanium or stainless steel or other suitable material are made the cathode. The titanium is etched by applying a pulsating current to the electrode, while the electrode is in contact with an electorlyte or etching bath of (1) anhydrous alcohol, preferably methanol, as the solvent, (2) inorganic etching salt soluble in the alcohol solvent, (3) at least one alcohol-soluble etching inhibitor agent, and (4) from significant amounts up to about 7 milliliters of water per liter of solution. The etching in such a bath may be carried out at room temperature or at higher temperatures, up to, for example, 80° C. It is desirable not to approach the boiling point of the bath composition. Best results are obtained at about room temperature.

Anhydrous methanol as the alcohol solvent component has given the best results in the practice of this invention. Anhydrous lower aliphatic monohydric alcohols such as ethanol and propanol and up through heptanol can be employed to replace a part of anhydrous methanol. Providing the inorganic etching salts have solubility in the anhydrous alcohol, ethanol and other monohydric alcohols, including alcohols such as 1-heptanol or 2-heptanol, may be substituted for the anhydrous methanol. Mixtures of the monohydric alcohols may be used if the salts are soluble therein.

The inorganic etching salt employed should be anhydrous. Examples of suitable salts are the ammonium halides, i.e., ammonmium chloride, ammonium bromide and ammonium iodide, including mixtures of two or more halides. Quaternary ammonium salts which consist of tetraalkyl ammonium halides may be employed, for example, tetramethyl ammonium chloride and tetrapropyl ammonium iodide. The generic formula for suitable quaternary salts is $R_4N \cdot X$ where R represents a monovalent lower alkyl radical having up to 4 carbons and X is a halide. The alkyl groups R may be different groups. The iodides and bromides are especially useful, the bromides being preferred. Soluble etching inhibitor agent may be an amide, preferably an N,N-dialkyl acyl amide, examples of which are N,N-dimethylformamide and N,N-diethylformamide. The preferred concentration of the inhibitor agent may range from about ½ milliliter to about 2 milliliters per liter of solution.

The soluble etching inhibitor agent may also be an organic amine, such as arylamines, alkylamines and alkanolamides, examples of which are, triethanolamine, dicyclohexylamine, benzylamine, phenylamine, triethylamine, diethanolamine, and propanolamine. The amines may be primary, secondary or tertiary and mixtures of two or more may be employed, for example, equal parts of ethanolamine and triethanolamine. The preferred concentration of the amine, like the amide, may range from about ½ milliliter to about 2 milliliters per liter of solution.

Mixtures of two or more amides or amines may also be employed. Thus, the present electrolyte bath or solution includes, as a necessary component, a small amount of at least one alcohol-soluble etching inhibitor agent, particularly good results being had with one or more compounds selected from the group consisting of dimethylformamide, triethanolamine, triethylamine and diethylamine. More than 2 milliliters of the amide or amine inhibitor agent may be present, but no significant benefits are secured by employing larger amounts.

An etching inhibitor consisting of a mixture of the amines and amides named above has been found to be particularly effective in etching titanium. For the most effective etching, the amine and the amide are preferably present in the approximate ratio of about 2 parts of the amine to 1 part of the amide. The amine may be triethanolamine, for example, and the amide may be dimethylformamide.

The range of concentrations for water in the bath has been stated to be from significant amounts, which may be as little as about 0.1 milliliter up to about 7 milliliters per liter of solution for etching titanium. The water may be added as such or it may be added to the solution as a component of any one of the other components. For example, 99.5% methanol may be used to introduce both methanol and water. Titanium has been etched in a water-free bath to provide a capacitance gain at least equal to and just slightly greater than the capacitance gain obtained by the prior-art etching baths. However, in the presence of these critical proportions of water, the capacitance gain has far exceeded the capacitance gain secured by etching in prior-art electrolytes. An added benefit secured by the presence of water in the composition is that a lower number of coulombs can be applied to produce the same area increase in the foil as is achieved without water being present. With a great excess of water, i.e., above about 2% by weight, the titanium is no longer selectively etched. As a consequence the effective area of the metal is not increased. Up to about 20 milliliters may, however, be advantageously employed for certain alloys, as will appear hereinafter.

A pulsating direct current, produced by establishing a pulsating potential between the anode and the cathode, is necessary in order to produce the desired pronounced area increase with the electrolyte both or solution of this invention. A particularly suitable form of current is the pulsating potential produced by the half-wave rectification of a 60 cycle alternating current. In this case, the foil is subjected to deplating or anodic current for 50% of the time and zero current for 50% of the time. Uniform or nearly uniform direct current is entirely unsatisfactory. Even the direct current produced by full-wave rectification of 60 cycle alternating current was found not to produce the same degree of etch of the titanium, notwithstanding the fact that this direct current had a substantial ripple content. It is necessary that the current applied to the titanium reach substantially zero for an appreciable period of the pulse or cycle. In some cases the titanium foil may be subjected to a reverse current for a fraction of the cycle, but in no event is the plating or cathodic current on the titanium to approach a potential evolving hydrogen.

It has also been discovered that capacitance gain attributed to the present etching electrolyte is influenced by whether or not the rolled or worked titanium foil or sheet is annealed and by the degree of annealing, as determined by the annealing temperature. That is to say, titanium foil heat treated at a lower temperature after cold working is etched to a greater effective area than foil heat treated at a higher temperature. As will be seen, the highest capacitance gain was obtained with unannealed titanium foil. Also noted was the fact that the milder the condition of etch, i.e., the lower the number of coulombs employed, the higher the spread in gain between two titanium samples of different heat histories, the samples heat treated at lower temperatures always showing the greater gain.

The term "etching inhibitor agent" may appear to be a misnomer, since with the etching electrolyte of this invention, the titanium is etched to a greater effective area than was heretofore possible. However, as implied by the terminology, the etching inhibitor agent, is believed to inhibit etching, but only in certain surface areas of the titanium. Consequently, it is theorized, high current densities are produced which are directed to and etch the uninhibited areas of the anode. As will become apparent, etching of the titanium in accordance with this invention is not limited to simple penetration of the surface, as in the prior-known methods. As indicated by photomicrographs of etched titanium foil, the etching of the present invention provides a combination of penetrations into given areas of the titanium which then project into the other areas below the surface. This etching action drastically increases the effective area of the etched foil so that capacitance gains are achieved which have heretofore been unattainable.

The following specific examples will serve to illustrate features of this invention. One mil thick titanium foil samples were etched in an electrolyte formulated in accordance with the teachings of the prior-art and in an electrolyte of the present invention. The pulsating direct current described hereinbefore, i.e., produced by the half-wave rectification of a 60 cycle, 120 volt alternating current, was employed throughout all examples. Here and in subsequent examples, the etched samples were all identically anodized in an electrolyte of 3 volumes of polyphosphoric acid to one volume of dimethylformamide. The anodizing was conducted at 12 volts, a current density of 1 ma. per sq. in. at 950° C. Capacitance was measured in a wet cell and the gain calculated as the ratio of the capacitance of the etched foil, to the capacitance of equivalent unetched foil.

The prior-art electrolyte, hereinafter designated Solution A, consisted of, per liter of solution, 24 grams of ammonium bromide, 0.3% by weight of water and the balance anhydrous methanol. The etching electrolyte of this invention, without any addition of water, designated Solution B, consisted, per liter of solution, of 24 grams of ammonium bromide, 1 milliliter of dimethylformamide, the balance being anhydrous methanol. Each 1 mil thick titanium foil sample was previously annealed at a temperature of 850° C. The results at various etching current densities in milliamperes summarized below in Table I.

TABLE I

| Example | Current density, ma./sq. in. | Etch, time, min. | Etch electrolyte solution | Capacitance gain |
|---|---|---|---|---|
| 1 | 20 | 16 | A | 2.6 |
| 2 | 20 | 16 | B | 1.01 |
| 3 | 60 | 16 | B | 2.6 |
| 4 | 80 | 16 | B | 4.4 |

As to Solution A, the electrolyte of Example 1, the capacitance gain of 2.6 represents the maximum gain attainable. No variation of current density, time or temperature in treating foils in Solution A would give a capacitance gain in excess of 2.6.

The suggested "inhibiting" nature of the amide appears to be supported by the examples. In the presence of the amide, there was no surface area increase in Solution B with the normal number of coulombs used in Examples 1 and 2. However, when the number of coulombs was increased threefold, as in Example 3, the capacitance gain achieved was equivalent to the gain in Example 1. When the number of coulombs was increased fourfold, as in Example 4, a capacitance gain of 4.4 was achieved, a figure which is significantly greater than the gain of 2.6 of Example 1. In subsequent experiments with Solution B, increasing the concentration of the amide above about 1 milliliter per liter of solution did not appear to offer any additional advantages.

The utilization of bromides other than ammonium bromide is illustrated in Table II. Examples 5-9, summarized below in Table II, illustrate the effect of substituting tetraethylammonium bromide in equimolar concentration for the ammonium bromide of Solution B. In Examples 5 to 9, 850° C. annealed titanium foil samples of 1 mil thickness were used. The etch electrolyte for Examples 5–7, hereinafter desginated Solution C, consisted, per liter of solution, of 80 grams of tetraethylammonium bromide, 1 milliliter of dimethylformamide, the balance anhydrous methanol. In Examples 5, 6, 8 and 9, the etch was conducted at room temperature, 25° C. In Example 7, the etch was conducted at 60° C. The data of Example 4 are included in Table II for the purpose of comparison.

TABLE II

| Example | Current density, ma./sq. in. | Etch, time, min. | Water addition, wt. percent | Capacitance gain |
|---|---|---|---|---|
| 5 | 40 | 16 | None | 1.62 |
| 6 | 80 | 16 | None | 4.47 |
| 7 | ¹ 60 | 15 | None | 1.89 |
| 8 | 60 | 15 | 0.25 | 4.02 |
| 9 | 60 | 15 | 0.50 | 4.42 |
| 4 | 80 | 16 | None | 4.4 |

¹ Sample etched at 60° C.

The examples of Table II show that tetraethylammonium bromide is as effective in giving a substantial etch as is ammonium bromide. This is evident upon comparing Examples 4 and 6. Since tetraethylammonium bromide is considerably more expensive than ammonium bromide, the ammonium bromide will ordinarily be preferred. It should be noted that the use of higher etching solution temperatures is not necessarily beneficial. A capacitance gain of 1.89 was achieved in Example 7 wherein the etching was conducted at 60° C. A room temperature etch (Example 3 of Table I) gives a gain of 2.6.

Small additions of water to the Solution C increase the capacitance gain in some proportion to the amount of water present. Examples 8 and 9 employed Solution C with the indicated additions. More important, however, is the fact that with the added water, a lower number of coulombs produced substantially the same capacitance gain as was achieved in Example 6, which employed the electrolyte without water.

An etch electroylyte, hereinafter designated Solution D was prepared which consisted per liter of solution, of 2 milliliters of triethanolamine, 24 grams of ammonium bromide, 1 milliliter of dimethylformamide, 0.25% by weight of water, the balance anhydrous methanol. A cold rolled titanium foil sample of 1 mil thickness, annealed at 850° C., was etched in Solution D under operating conditions comparable to the operating conditions of Examples 3 and 8. The result of this experiment is listed below as Example 10 in Table III. The data of Examples 3 and 8 are also listed in Table III for the purpose of comparison.

TABLE III

| Example | Current density, ma./sq. in. | Etch, time, min. | Etch electrolyte solution | Capacitance gain |
|---|---|---|---|---|
| 10 | 60 | 15 | D | 5 |
| 3 | 60 | 16 | B | 2.6 |
| 8 | 60 | 15 | C | 4.02 |

A capacitance gain of 5 indicates that a small concentration of amine is effective in further increasing the capacitance gain. Furthermore, by comparing Examples 10 and 3, the combination of amide, amine and water appears to be twice as effective in achieving increased capacitance gain as is the amide alone. In other tests, it was found that varying the concentration of the amine above 2 milliliters per liter of solution gave no apparent advantage in capacitance gain.

Figure 2:
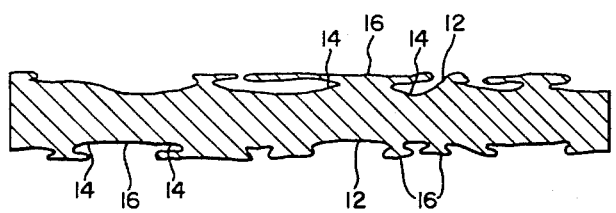
FIG. 2 is a photomicrograph of a cross-section of a titanium foil or electrode of the present invention.

A visual indication of the results of the present invention are best illustrated in comparing FIGS. 1 and 2. FIG. 1 represents a photomicrographic cross section of a 1 mil titanium electrode which was etched in the solutions which do not contain the etching inhibitor agent. FIG. 2 represents a photomicrographic cross section of a 1 mil titanium electrode which was etched in the presence of the agent. The photomicrographic representations of FIGS. 1 and 2 have the same degree of magnification, approximately 1000×.

In FIG. 1, the etching appears to be simple penetration of the foil surface, providing pits 10 having a larger area than the original surface area of the foil in FIG. 2, however the etching appears to be accomplished not only by direct penetration of the foil surface as at 12, but also by undercutting, as at 14, of the adjacent surface areas 16 of the foil surface, which in some areas exhibit no substantial surface etching.

The appearance of the etch in FIG. 2 is the suggested "inhibiting" mechanism by which the combined direct penetration and undercutting is accomplished. It appears as though certain areas, for example, the areas 16, of the foil surface are protected from action by the etching electrolyte by, for example, absorption of the inhibiting agent thereon. Consequently, the unprotected areas would be subjected to high current densities which first penetrate the foil surface and then undercut into the metal below the protected exterior surface areas. As can be seen in FIG. 2, the undercutting of the protected area of the foil, in effect, increases the exposed area by a factor of two. Since only certain areas of the foil surface are apparently protected against the etch electrolyte, there would seem to be no advantage in using a higher concentration of the inhibiting agent than is needed to fulfill this protective function. This is corroborated by the experimental results since increasing the concentration of the amine above 2 milliliters per liter of solution showed no apparent advantage in capacitance gain.

Heretofore, annealing of the worked foil before etching was considered one of the required steps, since annealed foil gave better operating characteristics. However, it has been found that employing the present etch electrolyte, invariably, a foil subjected at a lower anneal temperature achieved a greater capacitance gain than a foil previously annealed at a higher temperature.

For a comparison of the capacitance gain attainable with unannealed foil etched in the prior art Solution A and in the Solution D of this invention, attention is directed to Examples 11 and 12 summarized below in Table IV. In these examples, two 1 mil thick, unannealed titanium foil samples were employed. Sample 11 was etched in Solution A, which contained only ammonium bromide, water and methanol. Sample 12 was etched in Solution D of this invention. For comparison, Example 10, wherein the titanium foil was annealed at 850° C. prior to etching is also included in Table IV.

TABLE IV

| Example | Current density, ma./sq. in. | Etch, time, min. | Electrolyte solution | Capacitance gain |
|---|---|---|---|---|
| 11 (unannealed) | 40 | 12 | A | 2.8 |
| 12 (unannealed) | 60 | 16 | D | 12 |
| 10 (unannealed 850° C.) | 60 | 16 | D | 5 |

Example 12 shows a capacitance gain of 12, a value which has heretofore been unattainable by any means. The examples indicate that an unannealed foil etched in the electrolyte of the present invention, has a capacitance gain of approximately 4½ times the capacitance gain achieved with the electrolyte of the prior art and approximately 2½ times the capacitance gain achieved on annealed titanium foil in the etching solution of this invention.

Alloys of titanium, for example the ternary alloy comprising 5 to 55% titanium, 5 to 60% zirconium and from 20% to 80% niobium, set forth in application Ser. No. 393,130, assigned to the assignee of this invention, show great gains in capacitance when etched with Solutions B, C and D. The samples of this alloy were vacuum annealed for 30 minutes at 400° C. Higher concentrations of water, up to about 20 milliliters per liter of solution, may be advantageously employed in the etch solution. Similarly improved capacitance gains are obtained with other alloys of titanium such as the binary alloys.

In a similar way foils of tantalum, niobium and zirconium and base alloys thereof, etched in accordance with this invention, will exhibit similar increases in surface area and capacitance gain.

It should be readily apparent from the foregoing description that the present invention is an important advance in the art of etching metals suitable for use in electrolytic capacitors. By employing the etched electrodes of this invention having the considerable increase in surface area, there are obtained capacitors having an exceptionally high capacitance based on the volume occupied by the unit.

Figure 3:
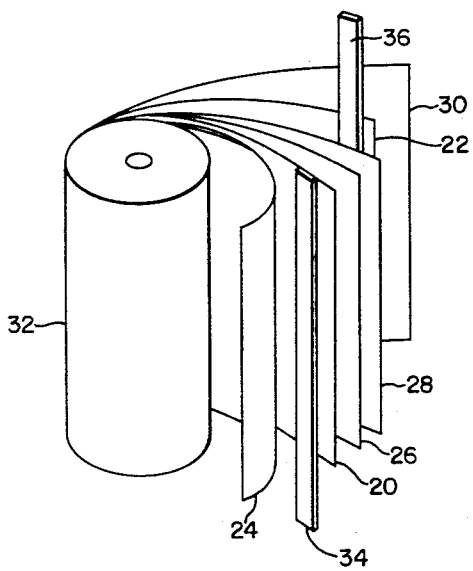
FIGS. 3 and 4 illustrate in perspective and cross-section, respectively, an electrolytic capacitor of a type in which the electrodes of the present invention can be used.
Figure 4:
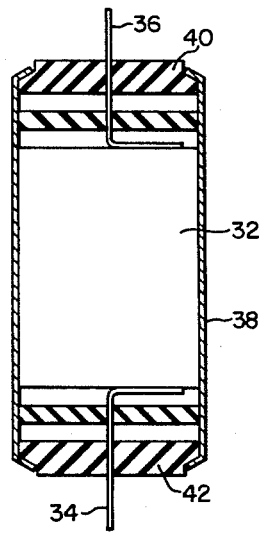

In FIG. 3 there is illustrated a capacitor of the electrolytic type, comprising titanium electrodes 20, 22 etched in accordance with the present invention, and alternately positioned spacing strips 24, 26, 28 and 30 of paper or other porous insulating material all wound into a compact roll 32 suitable for impregnation with a suitable electrolyte before or after insertion into a casing or container, in a manner well known in the art. Terminals or straps 34, 36 of opposite polarity are secured in contact with the electrodes 20, 22, respectively. In FIG. 4, the roll capacitor body 32 is inserted into a casing 38. Terminals 34, 36 extend through end plugs 40, 42 of insulating material which serve to seal off the opposite ends of the casing 38.

Although the invention has been described in connection with certain specific embodiments, it will be readily apparent to those skilled in the art that numerous modifications may be made without departing from the spirit and scope of the invention.

I claim as my invention:

1. A solution suitable for etching a metal selected from the group consisting of titanium, tantalum, niobium and zirconium and alloys thereof, consisting essentially of (1) an anhydrous monohydric aliphatic alcohol having up to 7 carbon atoms, (2) at least about 2 grams of at least one soluble halide salt of ammonia per liter of solution, (3) up to 20 milliliters of water per liter of solution, and (4) at least about 0.5 milliliter of at least one soluble etching inhibitor agent selected from the group consisting of alkylamines, arylamines, alkanolamines, alkylamides and arylamides, per liter of solution.

2. The solution of claim 1, in which at least part of the alcohol (1) is methanol and at least one soluble halide salt (2) is ammonium bromide.

3. The solution of claim 2, in which from about 0.1 to 7 milliliters of water per liter of solution is present.

4. The solution of claim 3, in which the etching inhibitor agent (4) is triethanolamine and dimethylformamide, in a volumetric ratio of about 2 parts of amine to 1 part of the amide.

5. The solution of claim 4, in which the alcohol (1) is essentially methanol, the soluble halide salt (2) is about 4 grams of calcium chloride and about 24 grams of ammonium bromide, per liter of solution, the water (3) is present in an amount of about 0.5 milliliter per liter of solution and the inhibitor agent (4) is about 2 milliliters of triethanolamine and 1 milliliter of dimethylformamide, per liter of solution.

6. The method of electrolytically etching a metal selected from the group consisting of titanium, niobium, tantalum and zirconium and alloys comprising at least one metal of this group, which method comprises the steps of making the metal the anode in a solution containing (1) an anhydrous monohydric lower aliphatic alcohol having up to 7 carbon atoms, (2) at least one halide salt soluble in the alcohol, and (3) at least about 0.5 milliliter of at least one etching inhibitor agent selected from the group consisting of alkylamines, arylamines, alkanolamines, alkylamides and arylamides per liter of solution, and applying a pulsating potential to the anode to dissolve the metal in a manner to produce a greatly increased surface area.

7. The method of claim 6 wherein said metal being etched is not heat treated after being cold worked into final shape.

8. The method of claim 6 in which said solution contains at least about 0.1 milliliter of water per liter of solution.

9. The method of claim 8 wherein said etching inhibitor agent comprises an amide and an amine.

10. The method of claim 9 wherein said etching inhibitor comprises triethanolamine and dimethylformamide.

References Cited
UNITED STATES PATENTS

| | | | |
|---|---|---|---|
| 2,863,811 | 12/1958 | Ruscetta et al. | 204—141 |
| 3,190,822 | 6/1965 | Burnham | 204—141 |

ROBERT K. MIHALEK, *Primary Examiner.*